United States Patent
O'Driscoll et al.

(10) Patent No.: US 12,146,811 B2
(45) Date of Patent: Nov. 19, 2024

(54) SYSTEMS, METHODS, AND COMPUTER PROGRAM PRODUCTS FOR FUGITIVE EMISSION DETERMINATIONS

(71) Applicant: Rebellion Photonics, Inc., Houston, TX (US)

(72) Inventors: Patrick Charles O'Driscoll, Houston, TX (US); Reza Katebi, Decatur, GA (US); Mohammad Lotfollahi Sohi, Houston, TX (US); Chuan Zhao, Sugar Land, TX (US); Quan Shen, Houston, TX (US); Xiaodan Ma, Houston, TX (US); Amirhossein Rafati, Alpharetta, GA (US); Bo Fu, Zhongshan (CN); Jaehoon Lee, Houston, TX (US)

(73) Assignee: Rebellion Photonics, Inc., Houston, TX (US)

( * ) Notice: Subject to any disclaimer, the term of this patent is extended or adjusted under 35 U.S.C. 154(b) by 219 days.

(21) Appl. No.: 17/552,904

(22) Filed: Dec. 16, 2021

(65) Prior Publication Data

US 2023/0194376 A1 Jun. 22, 2023

(51) Int. Cl.
*G01M 3/04* (2006.01)
*G01M 3/16* (2006.01)
*G01M 3/18* (2006.01)

(52) U.S. Cl.
CPC ............... *G01M 3/04* (2013.01); *G01M 3/16* (2013.01); *G01M 3/18* (2013.01)

(58) Field of Classification Search
CPC .......... G01M 3/04; G01M 3/002; G01M 3/38; G01M 3/16; G01M 3/18; G01M 3/181;
(Continued)

(56) References Cited

U.S. PATENT DOCUMENTS

| | | | |
|---|---|---|---|
| 2018/0266944 A1 | 9/2018 | Waxman et al. | |
| 2019/0340914 A1* | 11/2019 | Israelsen | G01M 3/04 |
| 2023/0177726 A1* | 6/2023 | Spears | G06V 10/454 |
| | | | 382/100 |

FOREIGN PATENT DOCUMENTS

WO 2019/213280 A1 11/2019

OTHER PUBLICATIONS

Fox, Thomas A. et al., A review of close-range and screening technologies for mitigating fugitive methane emissions in upstream oil and gas, May 31, 2019, Environ. Res. Lett., 14/5, https://iopscience.iop.org/article/10.1088/1748-9326/ab0cc3/pdf.
(Continued)

*Primary Examiner* — Paul M. West
(74) *Attorney, Agent, or Firm* — Alston & Bird LLP (57) ABSTRACT

Systems, methods, and computer program products for fugitive emission determinations are provided. An example imaging system includes a first infrared (IR) imaging device configured to generate first IR image data of a field of view of the first IR imaging device that include one or more data entries associated with a fugitive emission from an emission source. The system further includes a computing device operably connected with the first IR imaging device and configured to receive the first IR image data from the first IR imaging device, generate spectral absorption data based on the first IR image data, and determine a gas amount associated with the fugitive emission based upon the spectral absorption data. The computing device also determines a leak rate and leak duration of the fugitive emission based upon the determined gas amount and determines a total emission loss based on the same.

18 Claims, 5 Drawing Sheets

(58) Field of Classification Search
CPC ...... G01M 3/182; G01M 3/183; G01M 3/184; G01M 3/185; G01M 3/186; G01M 3/187; G01M 3/188
See application file for complete search history.

(56) References Cited

OTHER PUBLICATIONS

Office of Air Quality Planning and Standards, VOC Fugitive Losses: New Monitors, Emission Losses, and Potential Policy Gaps, Mar. 31, 2022.
U.S. Environmental Protection Agency Office of Air Quality Planning and Standards Air Quality Assessment Division, EPA Handbook: Optical and Remote Sensing for Measurement and Monitoring of Emissions Flux of Gases and Particulate Matter, Mar. 31, 2022.
European search report Mailed on Apr. 18, 2023 for EP Application No. 22208370, 8 page(s).

* cited by examiner

SYSTEMS, METHODS, AND COMPUTER PROGRAM PRODUCTS FOR FUGITIVE EMISSION DETERMINATIONS

TECHNOLOGICAL FIELD

Example embodiments of the present disclosure relate generally to imaging systems and, more particularly, to hyperspectral imaging to detect and quantify fugitive emissions.

BACKGROUND

In many environments, such as manufacturing facilities, drilling locations, pipelines, and/or the like, gases may be used, stored, transferred, moved, etc. For example, a natural gas pipeline may transport natural gas (e.g., methane and/or the like) between locations. During transport, some gas may be emitted from such an example pipeline, such as due to a leak in the pipeline system (e.g., due to poor sealing at pipe junctions, an impact with the pipeline, etc.). In order to identify a leak and/or quantify the amount of gas emitted (e.g., a fugitive emission) from the leak, hyperspectral cameras may be used. The inventors have identified numerous deficiencies with the existing technologies in this field, the remedies for which are the subject of the embodiments described herein.

BRIEF SUMMARY

As described above, many industries and environments rely upon or otherwise leverage gases in performing various operations associated with these industries. For example, the natural gas industry may extract, transport, and process natural gas (e.g., methane and/or the like) for subsequent use in generating heat, generating electricity, fueling vehicles, etc. The emittance of this gas to an external environment (e.g., a fugitive emission), such as due to a leak in one or more systems, may result in large costs in lost product as well as the potential for large fines from, for example, governmental regulatory agencies. Furthermore, the leakage of gases such as methane may present a dangerous condition to workers or otherwise impact workplace safety. As such, the accurate detection and quantification of fugitive emissions (e.g., a leaking plume of gas) is of critical importance in order to maximize profit while preventing hazardous conditions.

Although the detection of fugitive emissions is important in the environments described above, many traditional systems fail to property quantify the quantity of gas emitted by such a fugitive emission. By way of example, the total amount of gas emitted by a fugitive emission (e.g., gas leak) may vary based upon a number of factors (e.g., the size of the leak, the ambient temperature, the ambient pressure, the type of gas, etc.) and may further vary over the time period during which the leak is occurring. Determinations of the total loss associated with a fugitive emission may further be required for accurate accountability to regulatory authorities, governmental agencies, and/or the like (e.g., Environmental Protection Agency (EPA) regulations). The inability to properly quantify this total loss may result in penalties, fines, or other damages from these regulatory authorities and may further result in environmental damage and/or a negative impact on workplace safety. As such, the inability of conventional systems to account for environmental factors and the variability of an emission over time results in conventional systems that are ineffective at properly quantifying fugitive emissions.

To solve these issues and others, example implementations of embodiments of the present disclosure may leverage infrared (IR) imaging devices, such as those implemented in a hyperspectral camera implementation, to generate IR image data associated with a fugitive emission. A computing device operably connected with this IR image device may generate, via the use of a radiative transfer model or otherwise, spectral absorption data based upon the IR image data and may further determine a gas amount associated with the fugitive emission and determine a leak rate and a leak duration of the fugitive emission based upon the determined gas amount. Furthermore, the embodiments of the present disclosure may advantageously determine a total emission loss of the fugitive emission from the emission source based upon the determined leak rate and leak duration. In doing so, the embodiments of the present disclosure may account for the evolving environmental or ambient conditions proximate a fugitive emission so as to provide a time-based accounting of the total loss associated with the fugitive emission.

Apparatuses, methods, systems, devices, and associated computer program products are provided for fugitive emission determinations. An example imaging system may include a first infrared (IR) imaging device configured to generate first IR image data of a field of view of the first IR imaging device. The first IR image data may include one or more data entries associated with a fugitive emission from an emission source. The system may further include a computing device operably connected with the first IR imaging device. The computing device may be configured to receive the first IR image data from the first IR imaging device, generate spectral absorption data based upon the first IR image data, and determine a gas amount associated with the fugitive emission based upon the spectral absorption data. The computing device may further determine a leak rate and a leak duration of the fugitive emission based upon the determined gas amount; and determine a total emission loss of the fugitive emission from the emission source based upon the determined leak rate and leak duration.

In some embodiments, the computing device may be further configured to generate an alert signal comprising the total emission loss.

In some embodiments, the computing device may be further configured to determine an open state of the emission source at a first time based upon first IR image data generated at the first time. In such an embodiment, the computing device may be configured to generate the spectral absorption data based upon the first IR image data generated at the first time in response to the determined open state.

In some further embodiments, the computing device may be configured to iteratively generate first IR image data for iteratively determining the total emission loss of the fugitive emission in an instance in which the open state of the emission source is determined.

In other further embodiments, the computing device may be configured to determine a closed state of the emission source at a second time based upon first IR image data generated at the second time.

In some further embodiments, the computing device may be configured to generate the total emission loss of the fugitive emission based upon first IR image data generated between and including the first time and the second time.

In other further embodiments, the computing device may be further configured to receive a user input corresponding to the open state and/or the closed state.

In some embodiments, the system may further include a second IR imaging device operably connected to the computing device and configured to generate second IR image data of a field of view of the second IR imaging device. In such an embodiment, the second IR image data may include one or more data entries associated with the fugitive emission from the emission source, and the computing may be configured to determine the gas amount associated with the fugitive emission based upon spectral absorption data generated based upon the second IR image data.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device of an example imaging system as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "first IR imaging device" or "first IR imager" refer to a device or devices capable of generating first IR image data. Example first IR imaging devices may include a thermal imaging camera, an IR imager, an IR camera, a thermographic camera, and/or the like that may generate IR image data indicative of a field of view (FOV) of the first IR imaging device. Said differently, the first IR imaging device may include any device, apparatus, system, etc. capable of detecting infrared energy/radiation and converting said infrared energy/radiation into a corresponding electronic signal (e.g., first IR image data). By way of a non-limiting example, the first IR imaging device may include an IR camera configured to capture IR energy emitted by a fugitive emission from an example emission source as described hereafter located within a first FOV associated with the first IR imaging device. The first IR imaging device may also be associated with a first filter that defines a first band-pass frequency (e.g., a device that passes frequencies within a certain range and attenuates frequencies outside this range). As described hereafter, this first filter may be configured to pass IR radiation having a frequency associated with the fugitive emission (e.g., gas) for which the imaging device is design to monitor (e.g., methane or the like) to the first IR imaging device.

As used herein, the terms "second IR imaging device" or "second IR imager" refer to a device or devices capable of generating second IR image data. Example second IR imaging devices may also include a thermal imaging camera, an IR imager, an IR camera, a thermographic camera, and/or the like that may generate IR image data indicative of a field of view (FOV) of the second IR imaging device. Said differently, the second IR imaging device may include any device, apparatus, system, etc. capable of detecting infrared energy/radiation and converting said infrared energy/radiation into a corresponding electronic signal (e.g., second IR image data). By way of a non-limiting example, the second IR imaging device may also include an IR camera configured to capture IR energy emitted by a fugitive emission from an example emission source as described hereafter located within a second FOV associated with the second IR imaging device. The second IR imaging device may also be associated with a second filter that defines a second bandpass frequency (e.g., a device that passes frequencies within a certain range and attenuates frequencies outside this range). As described hereafter, this second filter may be configured to pass IR radiation having a frequency associated with the fugitive emission (e.g., gas) for which the imaging device is design to monitor (e.g., methane or the like) to the second IR imaging device and may further be configured for use with the same frequency as the first filter. Although described herein with reference to two (2) IR imaging devices, the present disclosure contemplates that the imaging system may include any number of IR imaging devices based upon the intended application of the imaging system.

As used herein, the term "computing device" refers to any user device, controller, object, or system which may be in physical or network communication with a first IR imaging device and the second IR imaging device as described hereafter. For example, the computing device may refer to a wireless electronic device configured to perform various IR image related operations in response to first IR image data and/or second IR image data generated by the first IR imaging device and the second IR imaging device, respectively. The computing device may be configured to communicate with the first IR imaging device and/or the second IR imaging device via Bluetooth, NFC, Wi-Fi, 3G, 4G, 5G protocols, and the like. In some instances, the computing device may comprise the first IR imaging device and/or the second IR imaging device (e.g., an integrated configuration).

As used herein, the terms "fugitive emission," "gas leak," "gas plume," and/or "gas leak plume" may refer to a collection of gas atoms or particles that include vast separation between individual atoms or particles. Such a gas may leak or otherwise be emitted from a containing vessel (e.g., natural gas pipeline or the like) or an emission source and may be formed as a plume or column. This plume may be a vertical body of a first fluid (e.g., the leaking gas) moving relative or through another second fluid (e.g., the ambient air). As would be evident in light of the present disclosure, the intensity of the gas may dissipate as the distance between the leaking gas and the source of the leak increases. For example, a gas leak from a pipeline that contains methane gas may result in a gas plume of methane gas emitted from the pipeline such that the intensity (e.g., concentration) of methane gas decreases as the distance between the particles of methane gas and the location of the leakage increases. Although described herein with reference to an example methane gas application, the present disclosure contemplates that the imaging system(s) described herein may be configured for use with gas of any type, concentration, etc.

As used herein, the term "emission source" may refer to any container, vessel, conduit, channel, etc. from which a fugitive emission may be emitted. By way of continued example, gas may leak or otherwise be emitted from a natural gas pipeline or the like (e.g., an emission source) and may be formed as a plume or column. The present disclosure contemplates that an "open state" of the emission source may refer to an instance in which the physical container, vessel, conduit, channel, etc. is physically open or otherwise emitting the fugitive emission. Similarly, the present disclosure contemplates that a "closed state" of the emission source may refer to an instance in which the physical container, vessel, conduit, channel, etc. is physically closed or an absence of a gas leak (e.g., fugitive emission) occurs. The present disclosure further contemplates that the "open state" may refer to any instance in which the presence of a fugitive emission or gas leak is determined (e.g., an emission event is occurring) such that the open state may refer to an open or ongoing determination of the total loss of the fugitive emission as described herein. Similarly, the present disclosure further contemplates that the "closed state" may refer to any instance in which a fugitive emission or gas leak is not present (e.g., an emission event is not occurring) such that the closed state may refer to a completed or time restricted determination of the total loss of the fugitive emission as described herein.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

Figure 1:
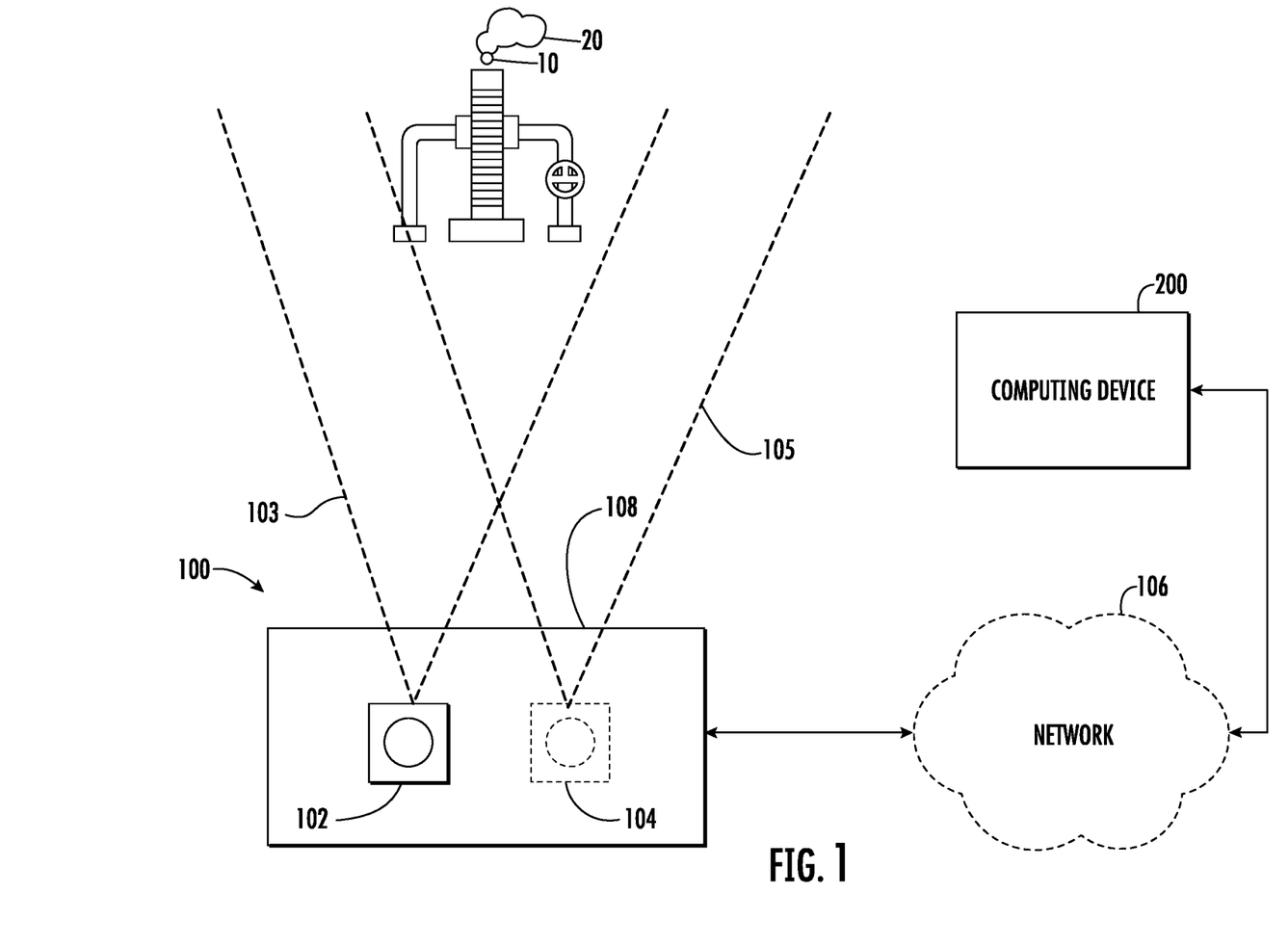
FIG. 1 illustrates an example imaging system in operation with a target gas leak (e.g., fugitive emission) in accordance with some example embodiments described herein.

With reference to FIG. 1, an example imaging system 100 is illustrated with a first IR imaging device 102 and a second IR imaging device 104 operably coupled with a computing device 200 via a network 106. As defined above, the first IR imaging device 102 may comprise a device capable of generating first IR image data and may be a thermal imaging camera, an IR imager, an IR camera, a thermographic camera, and/or the like. The first IR imaging device 102 may be associated with a FOV 103. The FOV 103 may refer to the observable area within which the first IR imaging device 102 may capture images (e.g., generate first IR image data). As described hereafter, in some embodiments, the first IR imaging device 102 may be positioned or oriented such that an emission source 10 is physically located within the FOV 103 of the first IR imaging device 102. Said differently, the FOV 103 of the first IR imaging device 102 may be such that first IR image data generated by the first IR imaging device 102 (e.g., captured IR images of the FOV 103) may include IR image data indicative of or otherwise associated with the emission source 10 (e.g., so as to capture IR image data of the fugitive emission 20). The present disclosure contemplates that the first IR imaging device 102 may be positioned at any physical location and at any orientation based upon the intended application of the system 100. Furthermore, the present disclosure contemplates that the FOV 103 may be varied based upon the operating parameters of the first IR imaging device 102.

In some embodiments, the imaging system 100 may include a second IR imaging device 104 that may comprise a device capable of generating second IR image data and may be a thermal imaging camera, an IR imager, an IR camera, a thermographic camera, and/or the like. The second IR imaging device 104 may be associated with a FOV 105. The FOV 105 may refer to the observable area within which the second IR imaging device 104 may capture images (e.g., generate second IR image data). As described hereafter, in some embodiments, the second IR imaging device 104 may be positioned or oriented such that an emission source 10 is physically located within the FOV 105 of the second IR imaging device 104. Said differently, the FOV 105 of the second IR imaging device 104 may be such that second IR image data generated by the second IR imaging device 104 (e.g., captured IR images of the FOV 105) may include IR image data indicative of or otherwise associated with the emission source 10 (e.g., so as to capture IR image data of the fugitive emission 20). The present disclosure contemplates that the second IR imaging device 104 may be positioned at any physical location and at any orientation based upon the intended application of the system 100. Furthermore, the present disclosure contemplates that the FOV 105 may be varied based upon the operating parameters of the second IR imaging device 104. As would be evident in light of the present disclosure, the first FOV 103 and the second FOV 105 may be different based upon the different positions of the respective first IR imaging device 102 and second IR imaging device 104. In other embodiments, the first FOV 103 and the second FOV 105 may at least partially overlap or coincide.

In some embodiments as described herein, the first IR imaging device 102 and the second IR imaging device 104 may be formed as an integral device or may be otherwise commonly housed, such as via housing 108 of a hyperspectral camera. In such an embodiment, the FOV 103 and the FOV 105 may, for example, at least partially overlap as described above. In other embodiments, the first IR imaging device 102 and the second IR imaging device 104 may be separately located. In any embodiment, the present disclosure contemplates that the FOV 103 and/or the FOV 105 may be dynamically adjusted (e.g., tilted, panned, pivoted, etc.) during performance of the operations described herein.

Figure 3:
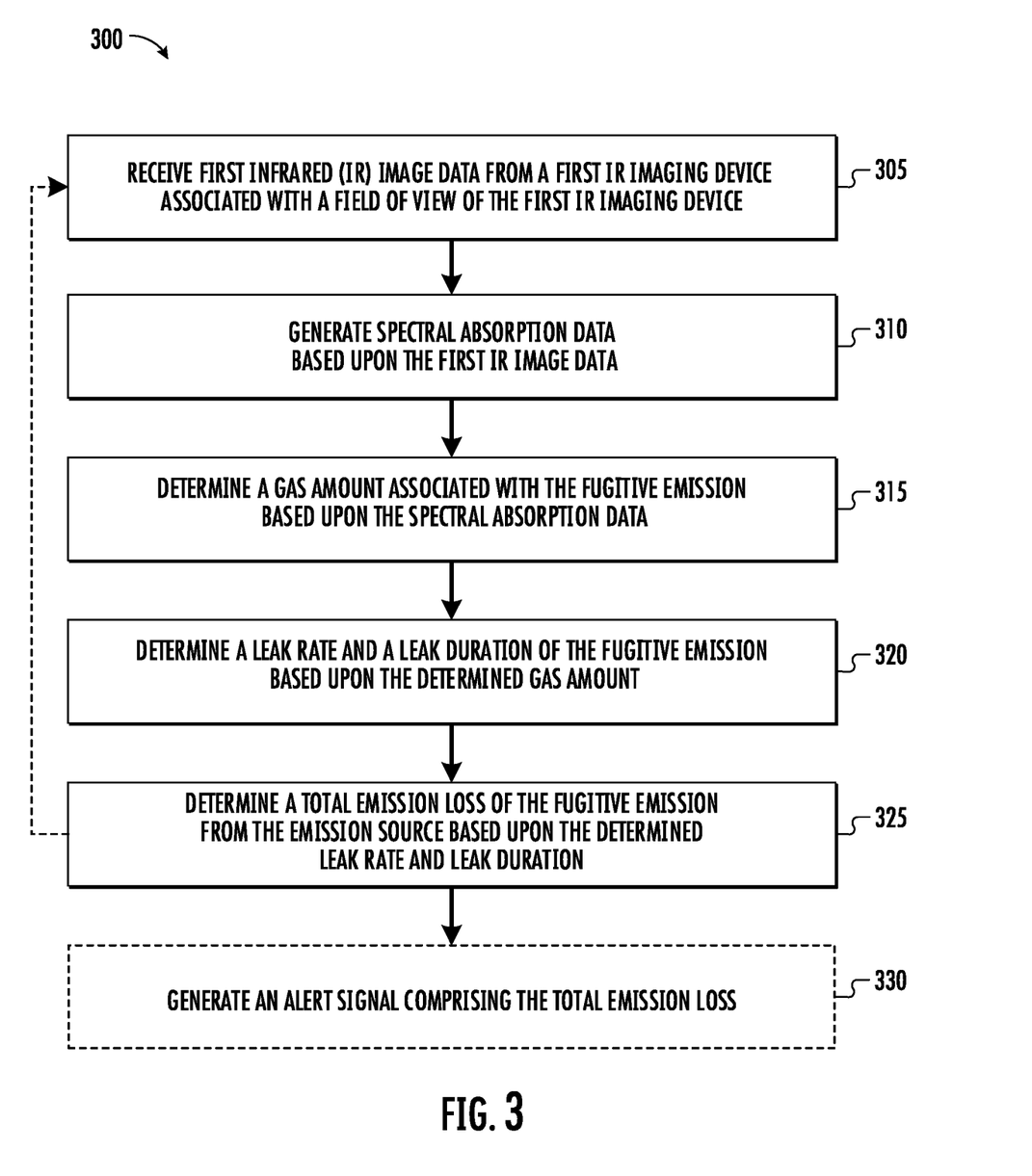
FIG. 3 illustrates an example flowchart for example fugitive emission determinations, in accordance with some example embodiments described herein.
Figure 4:
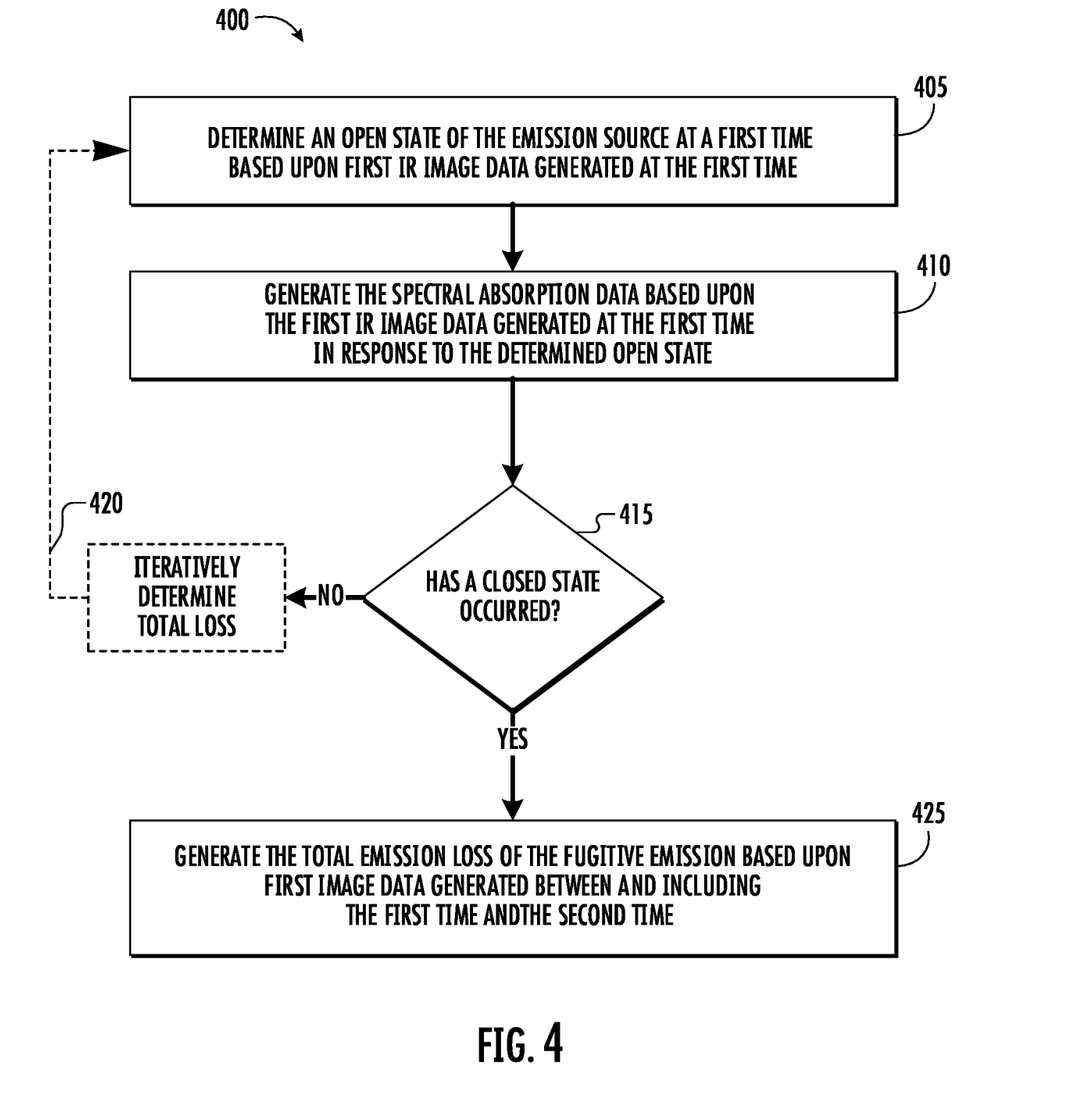
FIG. 4 illustrates an example flowchart for emission source state determinations, in accordance with some example embodiments described herein.
Figure 5:
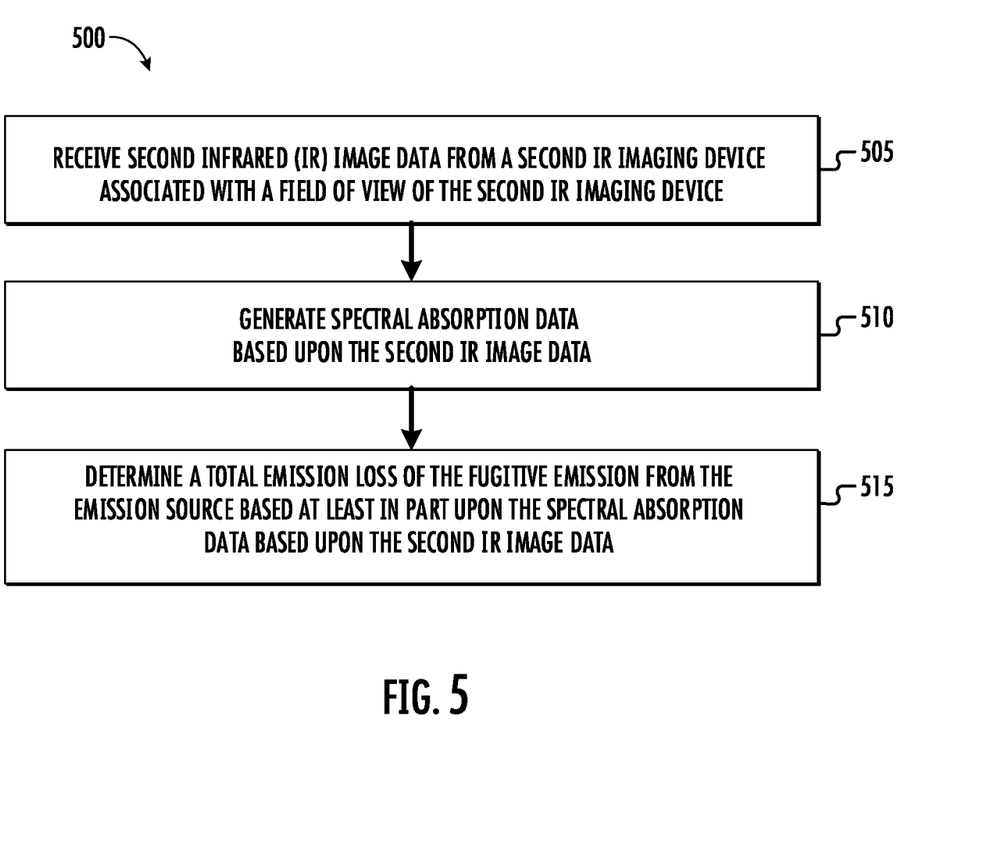
FIG. 5 illustrates an example flowchart for multiple imaging device implementations, in accordance with some example embodiments described herein.

As described hereafter with reference to the operations of FIGS. 3-5, the imaging system 100 of the present disclosure may be positioned proximate an emission source 10 (e.g., a pipeline or any feature, vessel, container, etc. from which gas may leak) so as to detect and quantify a fugitive emission 20 emitted from the emission source 10. The positioning may be such that a distance exists between the emission source 10 and, by association, the fugitive emission 20. As would be evident in light of the relative position of the first IR imaging device 102 and the second IR imaging device 104, the first IR image data generated by the first IR imaging device 102 and the second IR image data generated by the second IR imaging device 104 may differ due to the different perspectives (e.g., FOVs 103, 105) of these devices 102, 104. As such, a first feature (e.g., geometric center, center of mass, etc.) or set of features (e.g., corners, edges, contours, etc.) for the fugitive emission 20 in the first IR image data may differ from a second feature (e.g., geometric center, center of mass, etc.) or set of features (e.g., corners, edges, contours, etc.) for the same fugitive emission 20 in the second IR image data. As described hereafter with reference to FIG. 5, the embodiments of the present disclosure may leverage multiple sources of IR image data (e.g., first IR imaging device 102, second IR imaging device 104, etc.) in order to provide a robust solution for total loss determinations. As such, any disparity between the feature(s) of the fugitive emission 20 in the first IR image data and the feature(s) of the fugitive emission 20 in the second IR image data may be determined, accounted for, or otherwise considered in order to ensure accurate spectral absorption determinations.

With continued reference to FIG. 1, the imaging system 100 may include a computing device 200 that is connected with the first IR imaging device 102 and the second IR imaging device 104 over a network 106. In some instances, the first IR imaging device 102 may comprise the computing device 200, in whole or in part. In some instances, the second IR imaging device 104 may comprise the computing device 200, in whole or in part. In other instances, the first IR imaging device 102, the second IR imaging device 104, and the computing device 200 may be formed as a single, integrated device. The computing device 200 may include circuitry, networked processors, or the like configured to perform some or all of the apparatus-based (e.g., IR image based) processes described herein and may be any suitable processing device and/or network server. In this regard, the computing device 200 may be embodied by any of a variety of devices. For example, the computing device 200 may be configured to receive/transmit data (e.g., IR image data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 106 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 106 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 106 may include a public network, such as the Internet, a private network, such as an intranet, or combinations thereof, and may utilize a variety of networking protocols now available or later developed including, but not limited to TCP/IP based networking protocols. In some embodiments, the network 106 may refer to a collection of wired connections such that the first IR imaging device 102, the second IR imaging device 104, and/or the computing device 200 may be physically connected, via one or more networking cables or the like.

Figure 2:
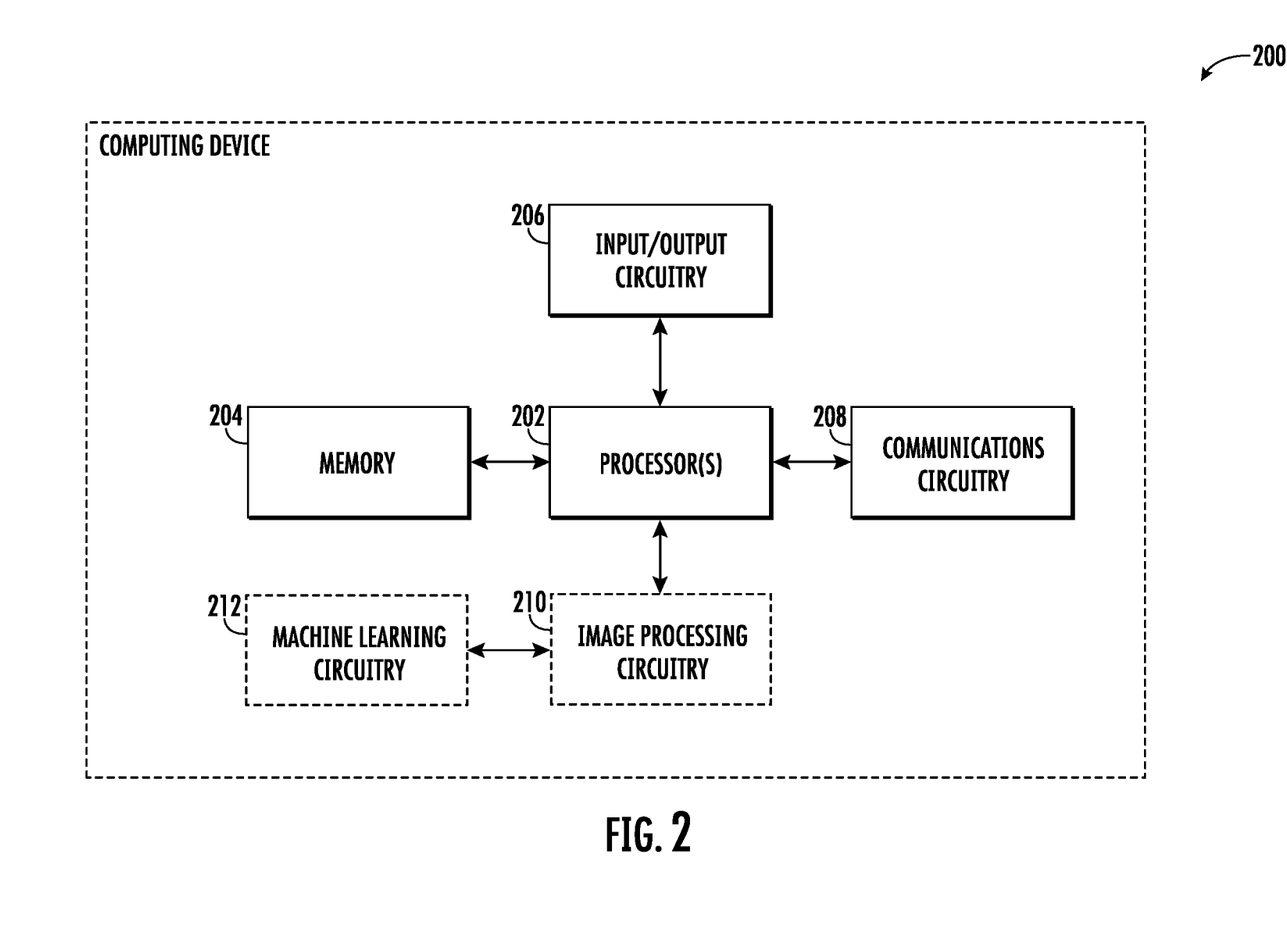
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include image processing circuitry 210 and/or machine learning circuitry 212. The computing device 200 may be configured to execute the operations described below in connection with FIGS. 3-5. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within the first IR imaging device 102 and/or the second IR imaging device 104. It will be understood in this regard that some of the components described in connection with the computing device 200 may be housed within one or more of the devices of FIG. 1, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The image processing circuitry 210 includes hardware components designed to analyze the first IR image data and/or the second IR image data so as to convert IR image data into spectral absorption data in accordance with one or more radiative transfer models leveraged by the system 100. The image processing circuitry 210 may further determine a gas amount associated with the fugitive emission 20 based upon this IR image data for further use in determining leak rate, leak duration, and/or total emission loss of the fugitive emission. Image processing circuitry 210 may utilize processing circuitry, such as the processor 202, to perform its corresponding operations, and may utilize memory 204 to store collected information. In some instances, the image processing circuitry 210 may further include machine learning circuitry 212 that includes hardware components designed to leverage artificial intelligence, supervised learning, unsupervised learning, etc. to analyze IR image data so as to iteratively determine the total emission loss of the fugitive emission. By way of example, machine learning circuitry 212 may comprise or leverage an artificial neural network or convolutional neural network trained on at least image data of a plurality of captured IR image data associated with gas leaks or plumes and/or user confirmation of open/closed states to improve subsequent operation of the operations described herein. The machine learning circuitry 212 may also utilize processing circuitry, such as the processor 202, to perform its corresponding operations, and may utilize memory 204 to store collected information.

It should also be appreciated that, in some embodiments, the image processing circuitry 210 and/or the machine learning circuitry 212 may include a separate processor, specially configured field programmable gate array (FPGA), or application specific interface circuit (ASIC) to perform its corresponding functions. In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as apparatuses, systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Fugitive Emission Determinations

FIG. 3 illustrates a flowchart containing a series of operations for example fugitive emission determinations. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 305, the apparatus (e.g., computing device 200) includes means, such as processor 202, communications circuitry 208, image processing circuitry 210, or the like, for receiving first infrared (IR) image data from a first IR imaging device 102 associated with a field of view 103 of the first IR imaging device 102. The first IR image data generated by the first IR imaging device 102 may include a plurality of data entries, one or more of which may be associated with particular pixels that represent the FOV 103 of the first IR imaging device 102. As shown in FIG. 1, the first IR image data may include one or more data entries associated with or otherwise indicative of the fugitive emission 20 from the emission source 10. For example, the first IR image data may be indicative of the intensity of the IR radiation received by the first IR imaging device 102 for each pixel captured for the FOV 103. As described above, the first IR imaging device 102 may also be associated with a first filter that defines a first band-pass frequency (e.g., a device that passes frequencies within a certain range and attenuates frequencies outside this range). This first filter may be configured to pass IR radiation having a frequency associated with the gas (e.g., fugitive emission 20) for which the first IR imaging device 102 is design to monitor (e.g., methane or the like) to the first IR imaging device 102.

In embodiments in which the computing device 200 and the first IR imaging device 102 are contained within a common device or integrated device (e.g., the computing device 200 comprises the first IR imaging device 102), the first IR image data may be received by the computing device 200 as part of normal operation of the first IR imaging device 102 (e.g., an internal transmission, if any). In other embodiments in which the computing device 200 is located separate from the first IR imaging device 102, such as connected via network 106, the computing device 200 may be configured to receive the first IR image data from the first IR imaging device 102 in response to generation of the first IR image data. Said differently, each instance of first IR image data generation may be transmitted to the computing device 200 upon generation. In other embodiments, the computing device 200 may periodically (e.g., according to a defined rate or sampling protocol) request first IR image data from the first IR imaging device 102.

In some embodiments, the first IR image data may be generated by the first IR imaging device 102 and/or transmitted to the computing device 200 in response to detection of a fugitive emission 20 within the FOV 103 of the first IR imaging device 102. By way of example, the generation of the first IR image data may be responsive to a change in the IR radiation received by the first IR imaging device 102, such as instances in which a fugitive emission 20 within the FOV 103 of the first IR imaging device 102 becomes present or becomes absent. Said differently, the first IR imaging device 102 may be configured to generate first IR image data in an instance in which the fugitive emission 20 is present within the FOV 103. Furthermore, in some embodiments, the first IR imaging device 102 may continuously generate first IR image data, and, in response to a detection of a fugitive emission 20 or otherwise, the first IR imaging device 102 may transmit a request containing the first IR image data to the computing device 200.

As shown in operation 310, the apparatus (e.g., computing device 200) includes means, such as processor 202, communications circuitry 208, image processing circuitry 210, or the like, for generating spectral absorption data based upon the first IR image data. As would be evident in light of the present disclosure, the first IR image data received at operation 305 may refer to a hyperspectral image cube in which a given x/y location or position in a traditional red/blue/green (rgb) visual camera also includes various IR radiation values (e.g., lambda 1, lambda 1, etc.) indicative of the intensity of the IR radiation received by the first IR imaging device 102 for each pixel captured for the FOV 103. In order to convert this IR image data for use in subsequent determinations, the computing device 200 may leverage one or more radiative transfer models. Radiative transfer may refer to the energy transfer in the form of electromagnetic radiation that propagates through an environment and is affected by absorption, emission, and/or scattering. A radiative or radiative transfer model may operate to estimate the absorption observed by the first IR imaging device 102 in that the first IR image data may be supplied to the radiative transfer model as inputs, and the radiative transfer model may, for example, output a gas amount (e.g., among other parameters) as described hereafter.

As would be evident in light of the present disclosure, the spectral absorption data may refer to the spectrum of absorption lines, bands, etc. that may result from the radiation (e.g., light) produced by a heated source (e.g., having a temperature differential with an ambient environment of the source (e.g., fugitive emission 20)). The source (e.g., fugitive emission 20) that produces a continuous spectrum passes through a relatively cooler gas, and the associated absorption spectrum is indicative of the fraction of incident electromagnetic radiation absorbed by the material over a range of frequencies. Such a spectrum as associated with the spectral absorption data, may be used as described in operation 315 to determine the amount of gas (e.g., fugitive emission 20) is present in a particular set of first IR image data. Although described herein with reference to an example radiative transfer model, the present disclosure contemplates that any mechanism for converting IR image data to spectral absorption data may be used by the computing device 200, including but not limited to, various absorption estimation models, absorption generation models, and/or the like.

Thereafter, as shown in operation 315, the apparatus (e.g., computing device 200) includes means, such as processor 202, communications circuitry 208, image processing circuitry 210, machine learning circuitry 212, or the like, for determining a gas amount associated with the fugitive emission based upon the spectral absorption data. As described above, the spectral absorption data generated based upon the first IR image data may be used to determine or otherwise estimate the presence or concentration of gas (e.g., fugitive emission 20) for each pixel due to the difference between energy levels for the absorption lines or bands of distinct elements at various wavelengths. As such, the present disclosure contemplates that the computing device 200 may operate to determine an amount of gas associated with the first IR image data (e.g., represented by the pixels captured by the first IR imaging device 102 at a particular time) via various techniques, including but not limited to foreground estimations, background estimations, times series analyses, or the like. By way of example, the computing device 200 may determine a gas amount that refers to the path-concentration on a pixel by pixel basis of the first IR image data (e.g., in parts per million per meter (ppm/m) or the like).

Thereafter, as shown in operation 320, the apparatus (e.g., computing device 200) includes means, such as processor 202, communications circuitry 208, image processing circuitry 210, machine learning circuitry 212, or the like, for determine a leak rate and a leak duration of the fugitive emission 20 based upon the determined gas amount. By way of example, the first IR imaging device 102 may continuously, intermittently, according to a sampling rate, or the like capture IR images (e.g., generate first IR image data) of the FOV 103 that includes a potential emission source 10. Prior to detection of a fugitive emission 20 within the FOV 103, the first IR image data may be iteratively analyzed to determine if gas (e.g., the fugitive emission 20) is present within the first IR image data. As described hereafter with reference to FIG. 4, the first IR imaging device 102 may generate first IR image data at a first time at which a fugitive emission 20 is present. Said differently, the first time may refer to any time period, instance in time, etc. at which the computing device 200, via analysis of the first IR image data, detects the presence of the fugitive emission 20.

Follow this initial detection, the computing device 200 may iteratively receive first IR image data associated with the FOV 103 so as to generate a time series of spectral absorption data and first IR image data. In this way, the computing device 200 may compare a change in intensity of the radiation received by the first IR imaging device 102 for each pixel within the FOV 103. By way of example, the computing device 200 may determine or otherwise detect a change in this intensity on a pixel level (e.g., determine the individual and collective change of intensity within the first IR image data). As such, these operations may determine a leak rate of the fugitive emission 20 by determining a net change in gas concentration within the FOV 103 based upon the first IR image data. Similarly, and as described further hereafter, the iterative capture and analysis of the first IR image data over a period of time (e.g., a time period beginning at the first time) may further operate to determine the leak duration. By way of continued example, the computing device 200 may, in any instance in which the first IR image data is indicative of the presence of the fugitive emission 20 (e.g., via the operations described above), determine that the emission source 10 is in an open state (e.g., continuing to leak gas or the like). As such, the leak duration at operation 320 may refer to an ongoing or open time period during which the total amount of gas emitted by the fugitive emission 20 is ongoing or tolling. In other embodiments, the computing device 200 may, in any instance in which the first IR image data does not indicate the presence of the fugitive emission 20, determine a closed or completed state (e.g., halting of the gas leak). As such, the leak duration at operation 320 may refer to a closed time period (e.g., from the first time to a second time) during which the total amount of gas emitted by the fugitive emission 20 may be determined (e.g., a relatively fixed mathematical value or range of values, within applicable tolerances). In some embodiments, the computing device 200 may receive a user input indicative of the open or closed states described hereafter.

Thereafter, as shown in operation 325, the apparatus (e.g., computing device 200) includes means, such as processor 202, communications circuitry 208, image processing circuitry 210, machine learning circuitry 212, or the like, for determining a total emission loss of the fugitive emission 20 from the emission source 10 based upon the determined leak rate and leak duration. As described, the computing device 200 may determine a leak rate indicative of the amount or change in amount of gas (e.g., fugitive emission 20) emitted by the emission source 10. Furthermore, the computing device 200 may, via imaging process operations as described above or user input, determine a leak duration associated with the amount of time during which gas was emitted. As such, the total emission loss determined at operation 320 may, for example, refer to the mathematical product of the leak rate and the leak duration. Although described herein with reference to the mathematical product between the leak rate and the leak duration, the present disclosure contemplates that any mathematical relationship between the leak rate and the leak duration may be used to determine the total emission loss based upon the intended application of the system 100. As would be evident in light of the present disclosure, operations 305-325 may be iteratively performed as part of a feedback look, trainable logic model, or other machine learning technique (e.g., reinforcement learning or the like). A user associated with the system 100 may review the first IR image data, leak rate, leak duration, and/or the like of the system 100 and may, for example, confirm that a gas leak (e.g., fugitive emission 20) is present so as to determine an open or closed state of the emission source 10 (e.g., a supervised or reinforcement learning technique).

In some embodiments, as shown at operation 330, the apparatus (e.g., computing device 200) includes means, such as processor 202, communications circuitry 208, image processing circuitry 210, machine learning circuitry 212, or the like, for generating an alert signal comprising the total emission loss. By way of example, the computing device 200, the first IR imaging device 102, and/or the system 100 may include a display by which a user may interface with the system 100. In such an embodiment, the computing device 200 may generate an alert signal that causes such a display to render a user interface that displays the mathematical value associated with the total emission loss. In other embodiments, such as when the computing device 200 is located remotely from the first IR imaging device 102, the alert signal generated at operation 330 may additionally or alternatively refer to the generation of a transmission that includes the total emission loss for display to an associated user. Although described herein with reference to a mathematical value, the present disclosure contemplates that the alert signal may also provide a range (e.g., a lower and upper bounded range of values based upon an associated level of confidence) representative of the total emission loss.

FIG. 4 illustrates a flowchart containing a series of operations for emission source state determinations. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 405, the apparatus (e.g., computing device 200) includes means, such as processor 202, communications circuitry 208, image processing circuitry 210, or the like, for determining an open state of the emission source 10 at a first time based upon first IR image data generated at the first time. As described above, the first IR image data received by the computing device 200 may be analyzed by the computing device 200 to, for example, determine the presence of the fugitive emission 20 (e.g., a gas leak) within the FOV 103. In an instance in which the fugitive emission 20 is detected, as performed by the image processing, spectral absorption, radiative transfer modeling, etc. operations above, the computing device 200 may determine an open state of the emission source 10. In other words, the open state of the emission source 10 may refer to any time at which the computing device 200 detects the presence, based upon a comparison with one or more thresholds or the like, of the fugitive emission 20 within the FOV 103. Similarly, the first time may refer to any instance in time at which the computing device 200 detects the presence of the fugitive gas 20 for which the IR image data generated at the instance in time immediately preceding the first time fails to include the fugitive emission 20 (e.g., prior to a detected gas leak).

Thereafter, as shown in operation 410, the apparatus (e.g., computing device 200) includes means, such as processor 202, communications circuitry 208, image processing circuitry 210, or the like, for generating the spectral absorption data based upon the first IR image data generated at the first time in response to the determined open state. The generation of the spectral absorption data at operation 410 may occur substantially the same as the operations described above with reference to FIG. 3 in that the computing device 200 may leverage or otherwise access a radiative transfer model to generate the spectral absorption data. In the operations of FIG. 4, however, this data may, for example, be time stamped or otherwise include time data indicative of the time at which the first IR image data was generated. In some embodiments, operation 410 may further include substantially the same determinations as described above with reference to operations 315-325 regarding determination of a gas amount, determination of a leak rate, determination of a leak duration, etc.

Thereafter, as shown in operation 415, the apparatus (e.g., computing device 200) includes means, such as processor 202, communications circuitry 208, image processing circuitry 210, or the like, for determining if a closed state of the emission source 10 has occurred at a second time. As described above, the computing device 200 may analyze the first IR image data generated by the first IR imaging device 102 to determine if the fugitive emission 20 is present in the FOV 103. By way of example, the first IR image data may include data entries indicative of the intensity of the IR radiation received by the first IR image device 102 for a plurality of pixels representing the FOV 103. As such, in some embodiments, the computing device 200 may analyze this intensity (e.g., the first IR image data) as described above with reference to FIG. 3 to determine the presence of the fugitive emission 20. Additionally or alternatively, the computing device 200 may receive a user input indicative of the open or closed state of the emission source 10. By way of example, an operator or user associated with the emission source may identify that the emission source 10 is currently leaking gas (e.g., emitting a fugitive emission 20). As such, the operator or user may, for example, close a valve, redirect a flow, or otherwise cause the emission source 10 to move to a closed state (e.g., stop the fugitive emission 20).

In an instance in which the closed state is not determined at operation 415, the apparatus (e.g., computing device 200) includes means, such as processor 202, communications circuitry 208, image processing circuitry 210, or the like, for iteratively generating first IR image data for iteratively determining the total emission loss of the fugitive emission as shown in operation 420. By way of continued example, the iterative capture and analysis of the first IR image data over a period of time (e.g., a time period beginning at the first time) may further operate to determine the leak duration. By way of continued example, the computing device 200 may, in an instance in which the first IR image data is indicative of the presence of the fugitive emission 20, determine that the emission source 10 is in an open state (e.g., continuing to leak gas or the like). As such, the controller may iteratively collect the first IR image data in that the fugitive emission 20 is ongoing or otherwise refers to an open time period during which the total amount of gas emitted by the fugitive emission 20 is ongoing, tolling, accruing, etc.

In an instance in which the closed state is determined at operation 415, the apparatus (e.g., computing device 200) includes means, such as processor 202, communications circuitry 208, image processing circuitry 210, or the like, for generating the total emission loss of the fugitive emission based upon first IR image data generated between and including the first time and the second time as shown in operation 425. By way of continued example, in an instance in which the first IR image data does not indicate the presence of the fugitive emission 20, the controller 200 may determine a closed or completed state (e.g., halting of the gas leak). As such, the leak duration described above at operation 425 may refer to a closed time period (e.g., from and including the first time to a second time) during which the total amount of gas emitted by the fugitive emission 20 may be determined (e.g., a relatively fixed mathematical value or range of values). In some embodiments, the computing device 200 may receive a user input indicative of the open or closed states as noted above.

FIG. 5 illustrates a flowchart containing a series of operations for multiple device implementations. The operations illustrated in FIG. 5 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 505, the apparatus (e.g., computing device 200) includes means, such as processor 202, communications circuitry 208, image processing circuitry 210, or the like, for receiving second infrared (IR) image data from a second IR imaging device 104 associated with a field of view 105 of the second IR imaging device 104. Similar to operation 305, the second IR image data generated by the second IR imaging device 104 may include a plurality of data entries, one or more of which may be associated with particular pixels that represent the FOV 105 of the second IR imaging device 104. As shown in FIG. 1, the second IR image data may include one or more data entries associated with or otherwise indicative of the fugitive emission 20 from the emission source 10. For example, the second IR image data may also be indicative of the intensity of the IR radiation received by the second IR imaging device 104 for each pixel captured for the FOV 105. As described above, the second IR imaging device 104 may also be associated with a second filter that defines a second band-pass frequency (e.g., a device that passes frequencies within a certain range and attenuates frequencies outside this range). This second filter may be configured to pass IR radiation having a frequency associated with the gas (e.g., fugitive emission 20) for which the second IR imaging device 104 is design to monitor (e.g., methane or the like) to the second IR imaging device 104.

In embodiments in which the computing device 200 and the second IR imaging device 104 are contained within a common device or integrated device (e.g., the computing device 200 comprises the second IR imaging device 104), the second IR image data may be received by the computing device 200 as part of normal operation of the second IR imaging device 104 (e.g., an internal transmission, if any). In other embodiments in which the computing device 200 is located separate from the second IR imaging device 104, such as connected via network 106, the computing device 200 may be configured to receive the second IR image data from the second IR imaging device 104 in response to generation of the second IR image data. Said differently, each instance of second IR image data generation may be transmitted to the computing device 200 upon generation. In other embodiments, the computing device 200 may periodically (e.g., according to a defined rate or sampling protocol) request second IR image data from the second IR imaging device 104.

In some embodiments, the second IR image data may be generated by the second IR imaging device 104 and/or transmitted to the computing device 200 in response to detection of a fugitive emission 20 within the FOV 105 by the second IR imaging device 104 or by the first IR imaging device 102. By way of example, the generation of the second IR image data may be responsive to a change in the IR radiation received by the second IR imaging device 104 or the first IR imaging device 102, such as instances in which a fugitive emission 20 within the FOV 105 of the second IR imaging device 104 becomes present or becomes absent. Said differently, the second IR imaging device 104 may be configured to generate second IR image data in an instance in which the fugitive emission 20 is present within the FOV 105. Furthermore, in some embodiments, the second IR imaging device 104 may continuously generate second IR image data, and, in response to a detection of a fugitive emission 20 or otherwise, the second IR imaging device 104 may transmit a request for the second IR image data to the computing device 200.

As shown in operation 510, the apparatus (e.g., computing device 200) includes means, such as processor 202, communications circuitry 208, image processing circuitry 210, or the like, for generating spectral absorption data based upon the second IR image data. Similar to operation 310, the second IR image data received at operation 505 may also refer to a hyperspectral image cube in which a given x/y location or position in a traditional red/blue/green (rgb) visual camera also includes various IR radiation values (e.g., lambda 1, lambda 1, etc.) indicative of the intensity of the IR radiation received by the second IR imaging device 104 for each pixel captured for the FOV 105. In order to convert this IR image data for use in subsequent determinations, the computing device 200 may leverage one or more radiative transfer models as described above.

In order to provide additional data sources so as to improve the determination regarding the total emission loss of the fugitive emission 20, the system 100 may leverage the spectral absorption data based upon the second IR image data in conjunction with the spectral absorption data based upon the first IR image data. In particular, as shown in operation 515, the apparatus (e.g., computing device 200) includes means, such as processor 202, communications circuitry 208, image processing circuitry 210, or the like, for determining a total emission loss of the fugitive emission from the emission source based at least in part upon the spectral absorption data based upon the second IR image data. For example, the use of the data generated by multiple IR imaging devices may provide additional reference data (e.g., IR intensity values) associated with the same or substantially the same pixels (e.g., pixels common to FOV 103 and FOV 105). As such the computing device 200 may operate to refine its total emission loss determinations based upon an increased dataset (e.g., a higher confidence output). Although described herein with reference to a second IR imaging device 104 and associated second IR image data, the present disclosure contemplates that data inputs from a variety of additional sources including additional broadband IR image data, visual image data (e.g., VIS and/or rgb data), and/or the like may be used to further improved upon the operations described above with reference to FIGS. 3-5.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200.

As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

The invention claimed is:

1. An imaging system comprising:
   a first infrared (IR) imaging device configured to generate first IR image data of a field of view of the first IR imaging device, wherein the first IR image data includes one or more data entries associated with a fugitive emission from an emission source; and
   a computing device operably connected with the first IR imaging device, wherein the computing device is configured to:
      receive the first IR image data from the first IR imaging device;
      generate spectral absorption data based upon the first IR image data;
      determine a gas amount associated with the fugitive emission based upon the spectral absorption data;
      determine a leak rate and a leak duration of the fugitive emission based upon the determined gas amount;
      determine a total emission loss of the fugitive emission from the emission source based upon the determined leak rate and leak duration; and
      receive a user input indicative of one or more of an open state and a closed state of the emission source.

2. The imaging system according to claim 1, wherein the computing device is further configured to generate an alert signal comprising the total emission loss.

3. The imaging system according to claim 1, wherein the computing device is further configured to:
   determine the open state of the emission source at a first time based upon first IR image data generated at the first time; and
   generate the spectral absorption data based upon the first IR image data generated at the first time in response to the determined open state.

4. The imaging system according to claim 3, wherein the computing device is further configured to iteratively generate first IR image data for iteratively determining the total emission loss of the fugitive emission in an instance in which the open state of the emission source is determined.

5. The imaging system according to claim 3, where the computing device is further configured to determine the closed state of the emission source at a second time based upon first IR image data generated at the second time.

6. The imaging system according to claim 5, wherein the computing device is further configured to generate the total emission loss of the fugitive emission based upon first IR image data generated between and including the first time and the second time.

7. The imaging system according to claim 1, further comprising a second IR imaging device operably connected to the computing device and configured to generate second IR image data of a field of view of the second IR imaging device, wherein the second IR image data includes one or more data entries associated with the fugitive emission from the emission source and wherein the computing is further configured to determine the gas amount associated with the fugitive emission based upon spectral absorption data generated based upon the second IR image data.

8. A computer-implemented method comprising:
   receiving first IR image data from a first infrared (IR) imaging device of a field of view of the first IR imaging device, wherein the first IR image data includes one or more data entries associated with a fugitive emission from an emission source;
   generating spectral absorption data based upon the first IR image data;
   determining a gas amount associated with the fugitive emission based upon the spectral absorption data;
   determining a leak rate and a leak duration of the fugitive emission based upon the determined gas amount;
   determining a total emission loss of the fugitive emission from the emission source based upon the determined leak rate and leak duration; and
   receiving a user input indicative of one or more of an open state and a closed state of the emission source.

9. The computer-implemented method according to claim 8, further comprising generating an alert signal comprising the total emission loss.

10. The computer-implemented method according to claim 8, further comprising:
    determining the open state of the emission source at a first time based upon first IR image data generated at the first time; and
    generating the spectral absorption data based upon the first IR image data generated at the first time in response to the open state.

11. The computer-implemented method according to claim 10, further comprising iteratively generating first IR image data for iteratively determining the total emission loss of the fugitive emission in an instance in which the open state of the emission source is determined.

12. The computer-implemented method according to claim 10, further comprising determining the closed state of the emission source at a second time based upon first IR image data generated at the second time.

13. The computer-implemented method according to claim 12, further comprising generating the total emission loss of the fugitive emission based upon first IR image data generated between and including the first time and the second time.

14. The computer-implemented method according to claim 8, further comprising:
    receiving second IR image data from a second IR imaging device of a field of view of the second IR imaging device, wherein the second IR image data includes one or more data entries associated with the fugitive emission from the emission source, wherein determining the gas amount associated with the fugitive emission is based upon spectral absorption data generated based upon the second IR image data.

15. A computer program product comprising at least one non-transitory computer-readable storage medium having computer program code thereon that, in execution with at least one processor, configures the computer program product for:

receiving first IR image data from a first infrared (IR) imaging device of a field of view of the first IR imaging device, wherein the first IR image data includes one or more data entries associated with a fugitive emission from an emission source;

generating spectral absorption data based upon the first IR image data;

determining a gas amount associated with the fugitive emission based upon the spectral absorption data;

determining a leak rate and a leak duration of the fugitive emission based upon the determined gas amount;

determining a total emission loss of the fugitive emission from the emission source based upon the determined leak rate and leak duration; and receiving a user input indicative of one or more of an open state and a closed state of the emission source.

16. The computer program product according to claim 15, further configured for generating an alert signal comprising the total emission loss.

17. The computer program product according to claim 15, further configured for:

determining the open state of the emission source at a first time based upon first IR image data generated at the first time; and generating the spectral absorption data based upon the first IR image data generated at the first time in response to the open state.

18. The computer program product according to claim 17, further configured for iteratively generating first IR image data for iteratively determining the total emission loss of the fugitive emission in an instance in which the open state of the emission source is determined.

\* \* \* \* \*